UNITED STATES PATENT OFFICE.

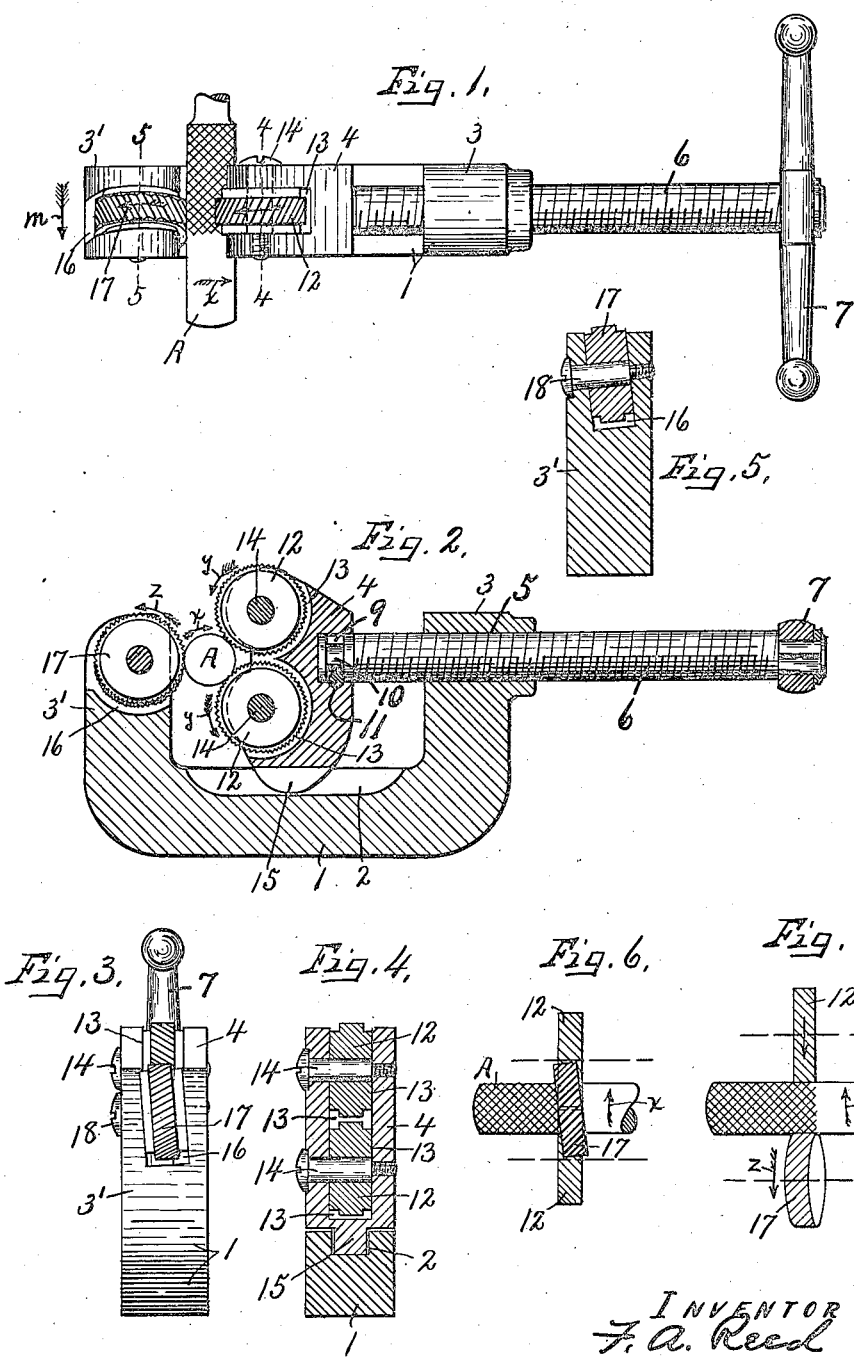

FRED A. REED, OF SYRACUSE, NEW YORK.

KNURLING TOOL.

1,414,668.   Specification of Letters Patent.   Patented May 2, 1922.

Application filed April 16, 1921. Serial No. 462,008.

*To all whom it may concern:*

Be it known that I, FRED A. REED, a citizen of the United States, and a resident of Syracuse, in the county of Onondaga, in the State of New York, have invented new and useful Improvements in Knurling Tools, of which the following, taken in connection with the accompanying drawings, is a full, clear, and exact description.

This invention relates to a knurling tool of the hand operated type adapted to be used for knurling cylindrical objects while held in and rotated by the chuck of a lathe or analogous machine, and the main object is to provide a simple, compact and highly efficient tool of this character capable of producing sharp and well defined embossments of uniform design upon cylindrical steel and other metal surfaces, and with a minimum amount of labor and attention on the part of the operator, and at the same time to enable the operator to vary the depth or relief of the knurl as may be desired for different classes of work.

Another object is to arrange the knurling wheels in such manner as to cause the tool to feed automatically along the work as the knurling progresses.

Other objects and uses relating to specific parts of the device will be brought out in the following description:

In the drawings:

Figure 1 is a top plan of a knurling tool embodying the various features of my invention.

Figure 2 is a longitudinal vertical sectional view of the same taken on line 2—2, Figure 1.

Figure 3 is an end view of the same device.

Figures 4 and 5 are transverse vertical sectional views taken, respectively, on lines 4—4 and 5—5, Figure 1.

Figure 6 is a diagrammatic face view of the knurling wheels in position for knurling, showing more particularly the relative angles of inclination of the knurling ribs on the peripheries thereof.

Figure 7 is a diagrammatic view of two knurling wheels engaging opposite faces of the work showing their effect upon the work.

As illustrated, this device comprises a U-shaped frame —1— of harden steel or other suitable material having its base provided with a lengthwise guide-way or groove —2— along the inner face between the opposite arms as —3— and —3'— for receiving and guiding the adjustable wheel-supporting-head —4—, presently described, and also for holding said head against turning movement.

The arms —3— and —3'— of the frame are disposed at substantially right angles to the main body, one of said arms being provided with a lengthwise threaded opening —5— for receiving a screw —6— which extends entirely through the opening —5— and has its outer end provided with a suitable handle —7— by which it may be rotated, the inner end of said screw being journaled in a socket —9— in the wheel-supporting-head —4— and provided with an annular groove —10— for receiving a tangential pin —11— in the head —4—, whereby endwise motion may be imparted to said head as the screw —6— is moved axially by its turning movement.

That is, the grooved inner end of the screw —6— and pin —11— constitute what may be termed a swiveled connection between the screw and head —4— to permit the screw to rotate relatively to the head, and at the same time to impart longitudinal movement to said head along the guide-way —2—.

A pair of knurling wheels —12— are journaled in recesses —13— in the inner face of the head —4— at opposite sides of the produced axis of the screw —6— and are held in place by screw-spindles —14— which are screwed in the opposite side walls of the recesses —13— and form journal bearings for the wheels —12—, which are held in slightly spaced relation transversely of the axis of the screw —6— in substantially the same plane as the arms —3— and —3'—.

The head —4— is of substantially the same face width as that of the frame —1— including the arms —3— and —3'—, while the recesses —13— and wheels —12— therein are of less face width than that of the head and central relatively thereto, thereby leaving sufficient stock at the outer ends of the wheels for the reception and support of the ends of the screw-spindles —14— and also serve to hold the wheels against endwise movement.

The inner side of the head —4— adjacent the base of the frame —1— is reduced in width to form a lengthwise rib —15— of substantially the same width and depth as the guide groove —2— in the base of the frame —1— for entering said groove and holding the head —4— against turning movement, and at the same time causing it to move in parallelism with the axis of the screw —6— as the latter is rotated to adjust the head and its wheels —12— toward and from the arm —3'—.

The outer end of this arm —3'— is also provided with a recess —16— for receiving an additional knurling wheel —17—, which is held in place by a screw-spindle —18— having its ends journaled in the opposite walls of the recess —16— to firmly hold the wheel —17— in operative position, said spindle —18— being disposed in a plane substantially mid-way between the axes of the spindles —14— or in line with the screw —6— so that when the wheels are brought together by the adjustment of the head —4—, the periphery of the wheel —17— will engage the peripheries of both of the wheels —12—.

All of the wheels are of substantially the same diameter and face width, and while the axes of the wheels —12— are substantially parallel to cause said wheels to rotate in substantially the same plane, the axis of the wheel —17— and its supporting pin —18— are disposed at an angle to the plane of rotation of the first named wheels to cause the knurling tool to automatically feed along the work when the wheels are adjusted to engage said work during the rotation of the latter.

That is, if the work as —A— is rotated in the direction indicated by arrow —X— Figures 1 and 2, the wheels —12— will be rotated in the same direction indicated by arrows —Y—, while the wheels —17— will be rotated in a reverse direction indicated by arrow —Z—, and the knurling device will be caused to move along the work due to the rotation of the wheel —17— in a plane at an angle to the plane of rotation of the wheels —12—.

The knurling wheels —12— are arranged with their axes in a plane at substantially right angles to the axis of the screw spindle —6— equal distances at opposite sides of said axis, which latter is, therefore, substantially tangential to the adjacent faces of the knurling wheels —12— so as to apply both knurling wheels to the work with equal pressure.

The knurling wheel —17— is arranged with its axis in a plane at right angles to the axis of the screw spindle —6— and therefore in a plane parallel with the plane passing through both of the axes with the wheels —12—, but as previously stated is inclined longitudinally at an angle to both of the opposed wheels but passing through the produced axis of the spindle —6— substantially midway between the opposite faces of the wheel —17— so as to bring its working side substantially midway between the working sides of the wheels —12— for simultaneously engaging the work at three points in its circumference.

The working sides or portions of the peripheries of the wheels which engage the work are substantially parallel, said wheels being provided with peripheral teeth or ribs extending diagonally across their respective faces at an angle to their respective axes, those on the periphery of the wheels —12— being inclined in the same direction, while those on the periphery of the wheel —17— are inclined in a reverse direction with the result that when the wheels are engaged with the work and the work is rotated, as for example in the direction indicated by arrow —X—, its periphery will be embossed by the ribs of the three wheels in such manner as to produce diamond-shaped relief upon the periphery of the work, while at the same time, the knurling tool will feed automatically along the work in the direction of arrow —m— by reason of the angle of inclination of the knurling wheel —17— relatively to the plane of rotation of the knurling wheels —12—.

For example in operation, assuming that the knurling tool is engaged with the work with the base of the frame at the under side thereof and the handle —7— facing the operator and also that the work is rotated toward the operator, then the rear side of the knurling wheel —17— engaging the work will move upwardly in the direction indicated by arrow —Z— Figure 2, and if the plane of rotation of this knurling wheel is inclined upwardly to the left, the lower side of course, would be inclined to the right of the plane of rotation of the wheels —12—, and owing to the upward movement of the knurling wheel —17—, it is evident that the tool as a whole would be caused to feed to the right, or in other words, would tend to roll along the work in that direction at a speed relatively to the speed of rotation of the work proportionate to the degree of inclination of the wheel —17—, since it is evident that the greater the angle, the faster the feed.

The construction and operation will now be clearly understood upon reference to the foregoing description and accompanying drawing, and while this construction is preferable, it is evident that various changes may be made in the structural details without departing from the spirit of this invention.

What I claim is:

1. A knurling tool comprising a —U— shaped frame, a carriage slidable on the frame between the arms thereof, a screw spindle on one of the arms for moving the carriage back and forth, a pair of knurling tools on said carriage, and an additional knurling tool upon the other of said arms.

2. A knurling tool comprising a frame, a knurling wheel mounted on the frame, a carriage movable along the frame toward and from the knurling wheel, a pair of knurling wheels mounted on said carriage, and means on the frame for adjusting the carriage toward and from the first named knurling wheel.

3. A knurling tool comprising a frame having a lengthwise guide-way, a carriage movable along said guide-way, a knurling wheel mounted on the frame at one end of the guide-way, a screw spindle mounted on the frame at the other end of the guide-way for adjusting the carriage along said guide-way, and a pair of knurling wheels mounted upon said carriage.

4. A knurling tool comprising a frame, a carriage movable along and upon the frame, means for adjusting the carriage, a pair of knurling wheels mounted upon the carriage to revolve about parallel axes, and a cooperative knurling wheel mounted upon the frame to revolve about an axis at an angle to that of the first named wheel.

5. In a knurling tool, the combination of a frame, a carriage movable lengthwise on the frame, a screw spindle mounted on the frame for adjusting the carriage, a pair of knurling wheels mounted on said carriage to revolve about axes at opposite sides of and at right angles to the axis of the screw spindle, and an additional knurling wheel mounted upon the frame to revolve in a plane at an angle to the plane of rotation of the first named wheel.

6. A knurling tool comprising a —U— shaped frame having a lengthwise guide-way along its base, a carriage movable along said guide-way between the arms of the frame, a screw spindle engaged in a threaded aperture in one of said arms for adjusting the carriage along the guide-way, a pair of knurling wheels mounted on the carriage to revolve about axes at opposite sides of and at right angles to the axis of the screw spindle, and an additional knurling wheel mounted upon the other arm of the frame to revolve in a plane at an angle to the plane of rotation of the first named wheels for automatically feeding the tool along the work during the knurling operation.

In witness whereof I have hereunto set my hand this 13th day of April, 1921.

FRED A. REED.

Witnesses:
H. E. CHASE,
M. R. COOKE.